US008762475B2

(12) United States Patent
Cheung et al.

(10) Patent No.: US 8,762,475 B2
(45) Date of Patent: Jun. 24, 2014

(54) SIMULTANEOUS INSTANT MESSAGING IN SINGLE WINDOW (75) Inventors: Dennis Takchi Cheung, San Carlos, CA (US); Gad Ittah, Cupertino, CA (US); Mohammad Rafiushan Khan, San Francisco, CA (US); Nikita Shah, Chicago, IL (US); Elizabeth I. Yang, Palo Alto, CA (US); Baskaran Dharmarajan, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 12/099,377

(22) Filed: Apr. 8, 2008

(65) Prior Publication Data
US 2009/0254616 A1 Oct. 8, 2009

(51) Int. Cl.
*G06F 15/16* (2006.01)

(52) U.S. Cl.
USPC ....................................................... 709/207

(58) Field of Classification Search
USPC .................................................. 709/206, 207
See application file for complete search history.

(56) References Cited

U.S. PATENT DOCUMENTS

| 6,539,421 | B1 * | 3/2003 | Appelman et al. ............ 709/206 |
| 6,557,027 | B1 * | 4/2003 | Cragun ......................... 709/204 |
| 6,624,831 | B1 | 9/2003 | Shahine et al. |
| 6,784,900 | B1 | 8/2004 | Dobronsky et al. |
| 6,907,447 | B1 | 6/2005 | Cooperman et al. |
| 6,981,223 | B2 * | 12/2005 | Becker et al. ................. 715/753 |
| 7,127,685 | B2 * | 10/2006 | Canfield et al. ............... 715/842 |
| 7,181,497 | B1 * | 2/2007 | Appelman et al. ............ 709/206 |
| 7,278,108 | B2 | 10/2007 | Duarte et al. |
| 7,305,470 | B2 | 12/2007 | Tom et al. |
| 7,353,466 | B2 * | 4/2008 | Crane et al. .................... 715/752 |
| 7,487,455 | B2 * | 2/2009 | Szeto ............................ 715/752 |
| 7,496,633 | B2 * | 2/2009 | Szeto et al. ................... 709/206 |
| 7,529,766 | B2 | 5/2009 | Shilo et al. |
| 7,617,283 | B2 * | 11/2009 | Aaron et al. .................. 709/206 |
| 7,653,693 | B2 * | 1/2010 | Heikes et al. ................. 709/206 |
| 7,725,551 | B2 * | 5/2010 | Szeto et al. ................... 709/206 |
| 7,779,076 | B2 * | 8/2010 | Heikes et al. ................. 709/206 |
| 7,818,379 | B1 * | 10/2010 | Heikes et al. ................. 709/206 |
| 7,856,469 | B2 * | 12/2010 | Chen et al. .................... 709/204 |
| 7,877,697 | B2 * | 1/2011 | Canfield et al. ............... 715/753 |
| 8,145,257 | B2 * | 3/2012 | Yim et al. .................. 455/550.1 |

(Continued)

OTHER PUBLICATIONS

Sawyer, Dan, Desktop Must-Haves, Mar. 2008, Specialized Systems Consultants, Linux Journal, vol. 2008, Issue 167, pp. 1-13.*

(Continued)

*Primary Examiner* — Alicia Baturay
(74) *Attorney, Agent, or Firm* — Bryan Webster; Andrew Sanders; Micky Minhas (57) ABSTRACT

Providing integrated multi-session instant messaging in a single instant messaging window. A user interface has an instant messaging window for displaying a plurality of conversation panes representative of concurrent instant messaging sessions between a local user and a plurality of remote users. Each conversation pane represents one of the messaging sessions. A plurality of message components correspond to the conversations panes so that each message component corresponds to one conversation pane. Each message component is arranged in the corresponding conversation pane and displays text from an instant message. The conversation display area displays at least two of the conversation panes linearly along the height of the window so that the message components arranged in the at least two conversation panes are simultaneously viewable.

17 Claims, 7 Drawing Sheets

(56) References Cited

U.S. PATENT DOCUMENTS

| | | | |
|---|---|---|---|
| 8,285,785 B2* | 10/2012 | Ekholm et al. | 709/204 |
| 8,332,474 B2* | 12/2012 | Glasgow | 709/206 |
| 8,335,825 B2* | 12/2012 | Glasgow | 709/206 |
| 8,375,088 B2* | 2/2013 | Glasgow | 709/206 |
| 8,375,325 B2 | 2/2013 | Wuttke | |
| 2003/0210265 A1 | 11/2003 | Haimberg | |
| 2004/0125130 A1 | 7/2004 | Flamini et al. | |
| 2004/0145608 A1 | 7/2004 | Fay et al. | |
| 2004/0228531 A1* | 11/2004 | Fernandez et al. | 382/187 |
| 2005/0149621 A1 | 7/2005 | Kirkland et al. | |
| 2005/0235034 A1* | 10/2005 | Chen et al. | 709/206 |
| 2006/0026245 A1* | 2/2006 | Cunningham et al. | 709/206 |
| 2006/0085515 A1* | 4/2006 | Kurtz et al. | 709/207 |
| 2006/0174207 A1 | 8/2006 | Deshpande | |
| 2006/0253586 A1 | 11/2006 | Woods | |
| 2007/0055943 A1 | 3/2007 | McCormack et al. | |
| 2007/0174407 A1 | 7/2007 | Chen et al. | |
| 2007/0186173 A1 | 8/2007 | Both et al. | |
| 2007/0288560 A1 | 12/2007 | Bou-Ghannam et al. | |
| 2008/0201434 A1* | 8/2008 | Holmes et al. | 709/206 |
| 2009/0043856 A1* | 2/2009 | Darby | 709/206 |

OTHER PUBLICATIONS

Unknown, "Adium," available at http://trac.adiumx.com/wiki/TabbedMessaging, 1 page.

Unknown, "Xeus Messenger," available at http://xeus-messenger.blogspot.com/search?q=window, Aug. 29, 2007, 6 pages.

* cited by examiner

SIMULTANEOUS INSTANT MESSAGING IN SINGLE WINDOW

BACKGROUND

Instant messaging (IM) provides a medium for communicating data between users in real-time over a network data processing system. Instant messaging is commonly used over the Internet. Instant messaging applications provide messages to users and monitor and report the status of users that have established each other as online contacts. This information is typically presented to a user in a window. Instant messaging applications are widely used for both business and personal communication. For example, instant messaging applications allow business users to view each other's availability and initiate a text conversation with colleagues or customers when a desired contact becomes available. With instant messaging becoming a prominent communication tool, the functionality and usability of instant messaging applications are particularly important.

Users of instant messaging applications often maintain multiple instant message conversations simultaneously. A conversation represents the communication between a local user and a remote user during an instant message session between the local user and the remote user. A local user maintains simultaneous conversations when the local user is concurrently involved in multiple messaging sessions, each with a different remote user. For example, a user maintains five instant message conversations when the user is concurrently involved in one-to-one messaging sessions with five remote users. Maintaining multiple conversations can often be cumbersome. In particular, tasks such as monitoring a user's conversations, switching among the conversations, and coordinating instant messaging windows with other application windows often become problematic.

For example, simultaneous conversations may be grouped in a window task bar. When a new message is received, the task bar may be highlighted. Users must click on the task bar, identify the conversation where the new message has been received (often with a highlighted icon or user name), and then navigate through the conversation windows serially in order to read new messages, to decide whether to respond, and to draft a response. These steps must be repeated for every conversation window in which a new message has been received. New messages often come in at the same time the user is reading and responding. Accordingly, a user must return to the task bar repeatedly, without an indication of the number of new messages within a conversation, who has sent the messages, or the importance or relevance of the incoming message to the user's ongoing work. Thus, the user is unable to efficiently manage the conversations.

In another example, automatic pop-up conversation windows are used to present new messages to the user. The messages are brought to the forefront of the user's desktop, often disrupting the user. The messages pop up without regard to the messages' importance and a user must use a pointing device, tabs, or an equivalent to minimize the window. Often the same window will pop up again as soon as it is minimized, because a user on the other end of the conversation has entered a new message in the window. Additionally, pop-up windows tend to capture inadvertent user input causing messages to be sent to the wrong person. Further, unwanted content (e.g., spam) is often presented to users in pop-up windows. As such, software directed to preventing unwanted content from being displayed to the user is commonly configured to block pop-up windows. Such software may block pop-conversation windows so that the user unknowingly fails to receive messages from other users.

SUMMARY

Aspects of the present invention provide integrated multi-session instant messaging. For example, multiple instant messaging conversations are provided that are simultaneously viewable in a single instant messaging (IM) window. In an aspect, a user interface displays message content and generates messages from different conversations simultaneously. Aspects of the invention advantageously provide users with a convenient and efficient method for managing multiple concurrent IM conversations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DESCRIPTION

Aspects of the present invention provide integrated multi-session instant messaging in a single instant messaging (IM) window. In an embodiment, the invention includes a user interface for displaying multiple IM conversations so that instant messages exchanged during the conversations are simultaneously viewable. Aspects of the invention advantageously provide users with a convenient and efficient method for managing multiple concurrent IM conversations.

Figure 1:
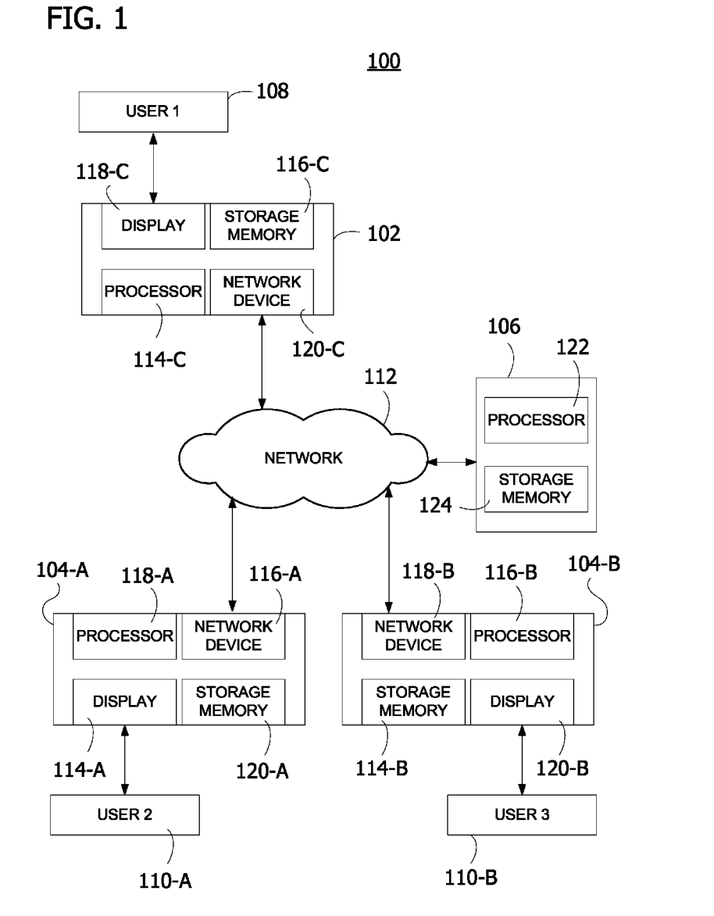
FIG. 1 is a block diagram illustrating an exemplary environment for multi-session instant messaging according to an embodiment of the invention.

Referring to FIG. 1, a block diagram illustrates an exemplary environment for providing instant messaging according to an embodiment. The environment 100 includes a plurality of computing devices 102, 104 and a server 106. Each of the plurality of computing devices 102, 104 is associated with at least one user 108, 110. Each user 108, 110 is assigned a user identification code (e.g., unique identifier), hereinafter user ID, that allows the user to be identified by other users. The plurality of computing devices includes a local computing device 102 associated with a local user 108 and a plurality of remote computing devices 104-A, 104-B respectively associated with a plurality of remote users 110-A, 110-B. The local computing device 102, the remote computing devices 104, and the server 106 may communicate with each other via the data communication network 112 so that the local user 108 may participate in concurrent (i.e., simultaneous) instant messaging sessions with a plurality of remote users 110.

The data communication network 112 may be any wireless or wired data network. For example, the communication data network 112 may be an include a wide area network (WAN), a local area network (LAN), an intranet, a peer-to-peer network, and other networks known in the art. As known to those skilled in the art, the data communication network 112 may include a collection of networks and routers that use the Transmission Control Protocol/Internet Protocol to communicate with one another. An internet typically includes a plurality of LANs and WANs that are interconnected by routers. Routers are special purpose computers used to interface one LAN or WAN to another. Communication links within the LANs may use twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, devices, such as the plurality of computing devices 102, 104 and the server 106, can be remotely connected to either the LANs or the WANs via a permanent network connection or via a modem and temporary link. Although not illustrated, it is understood that the data communication network 112 may include a vast number of such interconnected networks, computers, and routers.

In accordance with computing devices known in the art, the computing devices 102, 104 include a combination of the following: a processor 114, one or more computer-readable media (e.g., storage memory 116), an internal bus system coupling to various components within the computing devices (not shown), Input/Output devices (e.g., display 118), a networking device 120, and other devices. Exemplary computing devices 102, 104 include one or a combination of the following: a personal computer (PC), a workstation, a cellular phone, a portable digital device, a personal digital assistance (PDA), a pocket PC, a digital media player, and any other digital devices.

The computer-readable media may include volatile and/or nonvolatile media, removable and/or non-removable media, and/or any other available medium that may be accessed by a computer or a collection of computers (not shown). By way of example and not limitation, computer readable media include computer storage media (i.e., storage memory 116). The storage memory 116 includes any method or technology for storage of information such as computer readable instructions, data structures, program modules or other data. For example, the storage memory 116 may include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the components of the computing device 102, 104.

The processor 114 executes a plurality of computer-executable instructions for performing instant messaging operations. The storage memory 116 is accessible by the processor 114 for storing information and data for the processor 114 in connection with the operations performed by the processor 114. In one example, the processor 114 may execute computer-executable instructions embodied in one or more software applications, components within an application or software, executable library files, executable applets, or the like. In one example, the storage memory 116 stores the computer-executable instructions and/or other data used/accessed by the processor 114.

The input/output devices include a display 118 for presenting information processed by the processor 114 to the user of the computing device 108, 110. For example, the display 118 may include a monitor for displaying viewable images generated by the processor 114. The input/output devices may also other devices for allowing the user 108, 110 to input information and interact with information presented to the user by the display 118. For example, the input/output devices may include a mouse and/or a keyboard.

The server 106 includes a processor 122 and a storage memory 124 accessible the processor 122. In one example, the processor 122 may be a processing unit or a collection of processing units. The storage memory 124 may be a data store, a database, a collection of data stores or databases, or the like. The processor 122 may access the storage memory 124 directly or via a data communication network (e.g., 112). In one embodiment, the server 106 may be a computing device (described above), a cluster of computing devices, or a federation of computing devices. In another embodiment, the server 106 may include a web server, an authentication server, one or more back-end servers, one or more front-end servers, database servers, or any combination thereof. It is to be understood that other types of server computing devices or computing units may be part of the server 106 without departing from the scope of aspects of the invention.

In one embodiment, aspects of the invention are implemented in the environment 100 according to a server-based architecture. According to the embodiment, server 106 executes an instant messaging application for providing integrated multi-session instant messaging in a single IM window. In one example, the server 106 maintains a user database for storing identities (e.g., user IDs) of all users authorized to communicate instant messages via the server 106. The server 106 also stores other information associated with the users 108, 110, including passwords, contact lists or "buddy lists" (set of user IDs associated with the users which a particular user most frequently engages in IM conversations), Web pages, and other information. Users connect to the server 106 via a browser application (e.g., Hypertext Transfer Protocol application) installed on the users' computing devices 102, 104. The users 108, 110 may register and login to the server 106 from the users' respective computing devices 102, 104 by specifying the user IDs (and/or a password) associated with the respective users 108, 110. The server 106 is operative to receive requests from users (e.g., a remote user 104) to initiate IM conversations with users (e.g., the local user 108). The server 106 is operative to transmit a request for an IM conversation to the local computing device 102. If the local user 108 accepts the IM conversation request, an IM session between the local user 108 and the remote user 104 is established. The server 106 is similarly operative to simultaneously facilitate multiple concurrent IM sessions involving the local user 108. For each of the IM sessions, the server 106 is operative to receive instant messages from the local user 108 and the remote users 104. The server 106 is operative to define a user interface for reporting the messages directed to the local user 108 so that messages from a plurality of conversations are simultaneously viewable by the local user 108. The local computing device 102 displays the user interface for the local user 108 via a single browser window.

In one embodiment, aspects of the invention are implemented in the environment 100 according to a client-based architecture. According to the embodiment, the client computers 102, 104 execute instant messaging applications for providing integrated multi-session instant messaging in a single IM window. In one example, IM client applications are installed on each user's computing device 102, 104. The IM client applications may provide "buddy lists" containing the user IDs of the other users which the user most frequently engages in IM conversations. The server 106 exchanges connection information between a user and the other users included in the buddy list. After the server 106 exchanges the connection information, a user (e.g., remote users 104) may initiate conversations with another user (e.g., a local user 108) by selecting a user ID of the user to be contacted from the buddy list provided by the IM client application. The IM client application (via the computing device) then sends a request to initiate an IM session to an IM client application executing on the local computing device 102. The local user 108 may accept or decline the request. If the local user 108 accepts the request, an IM session is initiated and the local user 108 and the remote user 104 may exchange messages to each other in real time. If the local user 108 declines the request, no IM session is initiated and a message is provided to the remote user 104 that the request has been declined. The IM client applications may be configured to exclude the invitation to accept or decline for particular messages (e.g., text messages, messages from particular user IDs). The local computing device 102 is operative to receive messages directed to the local user 108 from multiple concurrent IM sessions involving the local user 108. The local computing device 102 is operative to define a user interface for reporting the messages directed to the local user 108 so that messages from a plurality of conversations are simultaneously viewable by the local user 108. The local computing device 102 is operative to display the user interface for the local user 108 via a single IM client application window.

Figure 2:
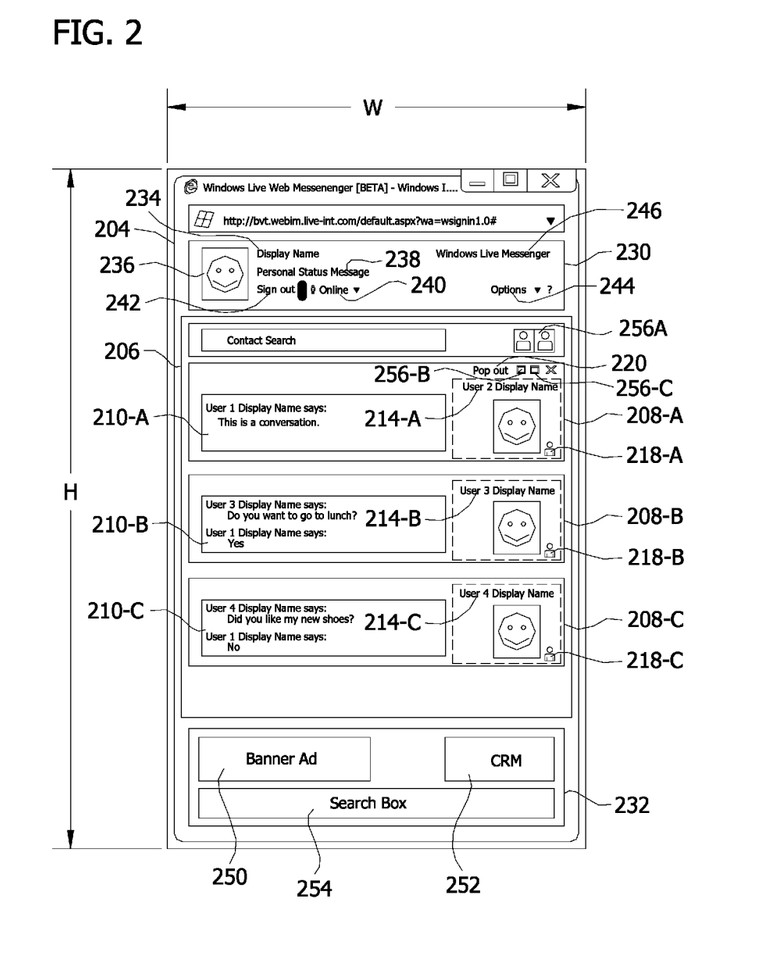
FIG. 2 is a drawing of an exemplary instant messaging window operating in conversation read mode for providing integrated multi-session instant messaging according to an embodiment of the invention.

FIG. 2 illustrates an exemplary user interface displayed in an IM window 204 (e.g., web browser window or client application window). The user interface is implemented within computer executable instructions stored on a computer readable storage medium (e.g., storage memory). The user interface includes an IM window 204 for displaying a plurality of the local user's 108 conversations so that message content from each of the conversations is simultaneously viewable. The IM window 204 has a window height (indicated as "H") and a window width (indicated as "W"). The window height and window width may be selected by the user or according to default settings so that the window 204 does not occupy an entire display screen of the local computing device 102. The IM window 204 includes a display area within the IM window 204. In one embodiment, the IM window 204 displays a conversation display area 206 in the display area. The user interface includes a plurality of conversation panes 208 for representing a plurality of different conversations (broadly, messaging sessions). Each messaging session is between the local user 108 and one of the remote users 104. The user interface includes a plurality of message components 210 corresponding to the plurality of different conversations and representative conversation panes 208 such that each message component 210 corresponds to one conversation/conversation pane 208. Each of the message components 210 displays text from an instant message exchanged between the local user 108 and one of the remote users 110 during the corresponding conversation. Each of the message components 210 is arranged in the respective corresponding conversation pane 208.

The conversation display area 206 displays a set of the conversation panes 208 (i.e., at least two of the conversation panes 208) linearly along the height of the window 204 so that the message components 210 arranged in the conversation panes 208 of the set are simultaneously viewable. In the illustrated example, conversation panes 208-A, 208-B, and 208-C are horizontal tabs sequentially stacked in the conversation display area 206 along the height of the window 204. In particular, conversation pane 208-B is stacked beneath conversation pane 208-A along the height of the window 204. Similarly, conversation pane 208-C is stacked beneath conversation pane 208-B along the height of the window 204. Accordingly, the user interface allows the local user 108 to conveniently and efficiently view multiple conversations at once.

Figure 3:
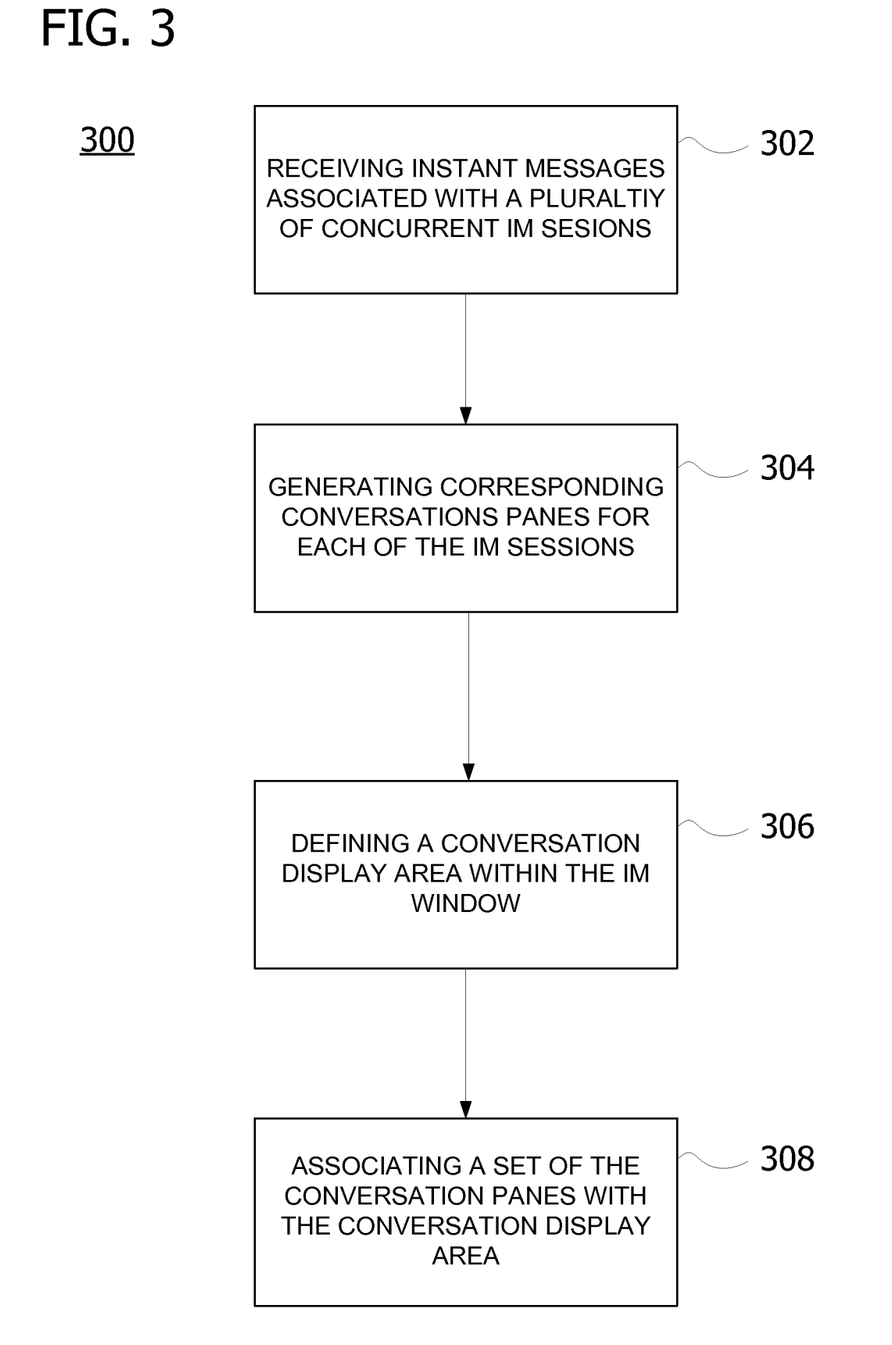
FIG. 3 is a block diagram illustrating an exemplary method for providing multi-session instant messaging according to an embodiment of the invention.

FIG. 3 is a block diagram illustrating an exemplary method 300 for providing aspects of the user interface. In one embodiment, the method may be carried out by the server 106 for providing instant messaging via a single IM window 204 in an environment 100 having a server-based architecture. In another embodiment, the method may be carried out by the local computing device 102 for providing instant messaging via a single IM window 204 in an environment 100 having a client-based architecture. At 302, the method includes receiving instant messages associated with a plurality of concurrent instant messaging sessions involving the local user 108. At 304, the method includes generating a distinct corresponding conversation pane 208 for each of the plurality of concurrent instant messaging sessions. Each corresponding conversation pane 208 has a message component 210 as discussed above. At 306, the method includes defining a conversation display area 206 in the IM window 204 as a function of the window height and the window width. For example, a display area height may be variable as a function of (e.g., proportional to) the window height. Similarly, a display area width may be variable as a function of (e.g., proportional to) the window width. Accordingly, if local user 108 resizes the window height and window width, the display area height and display area width are respectively adjusted.

At 308, the method includes associating a particular set of the conversation panes 208 with the conversation display area 206. As illustrated in FIG. 2, the conversation panes 208 of the set are aligned along the height of the IM window 204 so that the message components 210 of the conversation panes 208 of said set are simultaneously viewable in the conversation display area 206 of the IM window 204. The conversation panes 208 may be aligned in a particular order along the height of the IM window 204. For example, the conversation panes 208 may be arranged in the order in which the conversation panes 208 were generated (e.g., an order that the conversations were initiated) with the first generated conversation pane 208-A arranged near the top of the conversation display area 206 and subsequently generated conversations panes 208-B, 208-C respectively arranged beneath the first generated conversation pane 208-A.

Each conversation pane 208 has a pane height and a pane width. The window height, window width, display area height, display area width, pane height, and pane width may each be fixed, or variable independent or dependent of each other. In one embodiment, the pane width is determined as a function of the window width. In one embodiment, for a particular display area height, the conversation display area 206 is configured to display a pre-determined maximum number (i.e., specific number) of simultaneously viewable conversation panes 208. The conversation panes 208 are assigned equal pane heights which are fixed as a function of the pre-determined number of conversation panes 208. The pre-determined number may be specified by the local user 108. When the number of conversation panes 208 exceeds the pre-determined number of conversation panes 208, the user interface includes a conversation pane selection component for receiving a request from the local user 108 to display another set of conversation panes 208 having at least one conversation pane 208 that is different from the conversation panes 208 being displayed by the conversation display area 206. For example, the conversation display area 206 may be configured to display four simultaneously viewable conversation panes 208 having a particular pane height. When the local user 108 engages in a fifth conversation so that a fifth conversation pane 208 is generated, the user interface includes a scrollbar (or other known graphic user interface component) so that the local user 108 can scroll the set of simultaneously viewable conversation panes 208 in the conversation display area 206.

In one embodiment, the conversation pane 208 notifies the user when a new message in the represented conversation is received. For example, when a message is received from a remote user from a conversation represented by a background conversation pane (i.e., unselected conversation pane 208), the background conversation pane is configured according to an alert state. For instance, the conversation pane 208 and/or message component 210 may change colors (e.g., flash) in order to alert the local user 108 of the received message. Additionally or alternatively, the conversation pane 208 may include message status information. For example, the message component 210 may include message status text, such as "last message received 3 minutes ago." Accordingly, the local user can simultaneously view the message status of the conversations represented by the conversation panes 208.

In one embodiment, the user interface further includes a plurality of identifying components 212 corresponding to the plurality of different conversations/conversation panes 208 such that each identifying component 212 corresponds to one conversation/conversation pane. Each of the identifying components 212 displays information (e.g., text, graphics) identifying the remote user 104 of the corresponding conversation. Each of the identifying components 212 is arranged in the respective corresponding conversation pane 208. For example, the identifying component 212 may display text representing the user ID associated with the remote user 104 (e.g., personal display name 214). Additionally or alternatively the identifying component 212 may display a graphic associated with the remote user 104 (e.g., personal display picture 216). In one embodiment, the user interface further includes a status component 218 indicative of the remote user's 110 status (e.g., away, busy, online, etc.,).

In one embodiment, the user interface includes a new window selection component 220 for receiving a request form the local user 108 for a new window to be generated that displays a selected conversation pane 208-A. In one embodiment, a new window displaying the selected conversation pane 208-A is generated and the selected conversation pane 208-A is removed from the conversation display area 206 in response to the request.

In one embodiment, the user interface includes a header area 232 and/or a footer area 232. The header area 232 may display one or more of the following components associated with the local user 102: a personal display name 234, a personal display picture 236, a personal status message 238, an online status 240 (e.g., online, busy, be right back, away, in a call, etc.,), a sign out link 242, an options menu 244 (e.g., user preferences), and a service branding component 246. The footer area 232 may display one or more of the following components: a banner ad 250, a module 252 for presenting the local user 108 with content for downloading, and a web search box 254.

In one embodiment, user interface includes preview component (not shown) for notifying the local user 108 when a contact has signed in and/or signed off. For example, the preview component may be displayed for a finite amount of time (e.g., 3 seconds) in the IM window 204 in the header area 230. In one embodiment, the user interface includes a message notification element (not shown) when a new message is received in a conversation and the representative conversation pane 208 is not being displayed (e.g., the conversation pane 208 is not included in the displayed set of conversations, the user interface is in contact mode as discussed below). The message notification element may display a preview of the message received and/or the user ID of the sending remote user 104.

In one embodiment, user interface is configured to selectively display content in the display area of the IM window 204 as a function of a plurality of modes. Accordingly, the user interface includes a mode selection component 256 for receiving a request from the local user 108 to replace the content being displayed in the display area with content corresponding to one of the modes. The plurality of modes (discussed below) includes one or more of the following: contacts mode, conversation read mode, conversation exchange mode, and full conversation mode. Referring to FIG. 2 and the above description, the user interface displays the conversation display area 206 in the display area when the user interface is in conversation read mode. As discussed above, the conversation read mode allows the local user 108 to simultaneously view message content from a plurality of conversations in a single window. For example, the conversation read mode may be used when the local user 108 has been inactive for a pre-determined amount of time.

Figure 4:
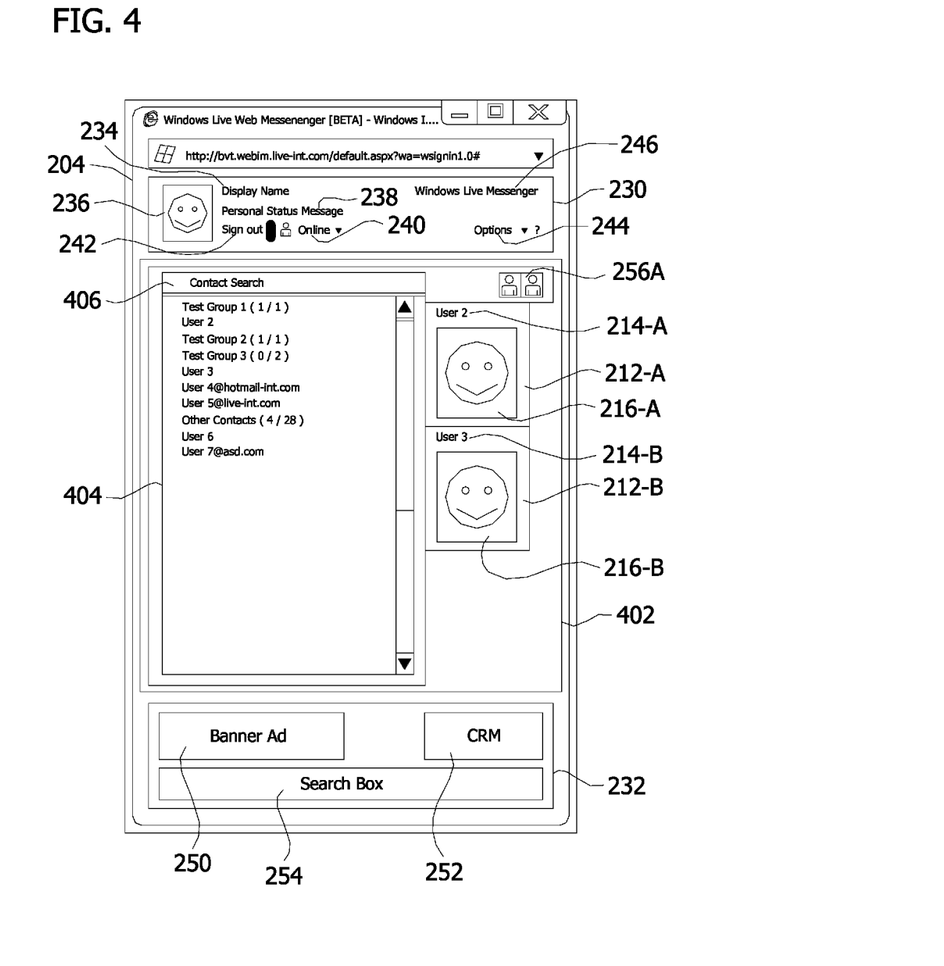
FIG. 4 is a drawing of an exemplary instant messaging window operating in contacts mode for providing integrated multi-session instant messaging according to an embodiment of the invention.

Referring to FIG. 4, the user interface displays content associated with the contacts mode. In particular, a contacts display area 402 is displayed in the display area of the IM window 204. For example, when the local user 108 first executes the IM application, the IM application operates in a contacts mode. Alternatively, the local user 108 may select contacts mode in order to initiate a new messaging session. The contacts display area 402 includes a contacts list component 404 for displaying a list of contacts (i.e., contacts list) associated with the local user 108. Each contact identifies a remote user 104 or a group of remote users 104. For example, the contacts list component 404 may display the local user's 108 buddies (selected user IDs) and/or buddy groups (particular groups of user IDs). The contacts list component 404 allows a user to select a contact. In response to receiving a selected contact, the local user 108 can request one or more of the following operations: initiate a messaging session with the selected contact, delete the contact from the contacts list, block the contact, move the contact from one group of users to another group of users, copy the contact from one group of users to another group of users.

In one embodiment, the contacts list display area 402 also includes a contacts search component 406 for receiving a request from the local user 108 to filter the contacts list for a specific contact. In another embodiment, the contacts search component 406 is included in the IM window 204 separate from the contacts display area 402 so that the contacts search component 406 is displayed in the IM window 204 independent from the operation mode of the IM application.

Figure 5:
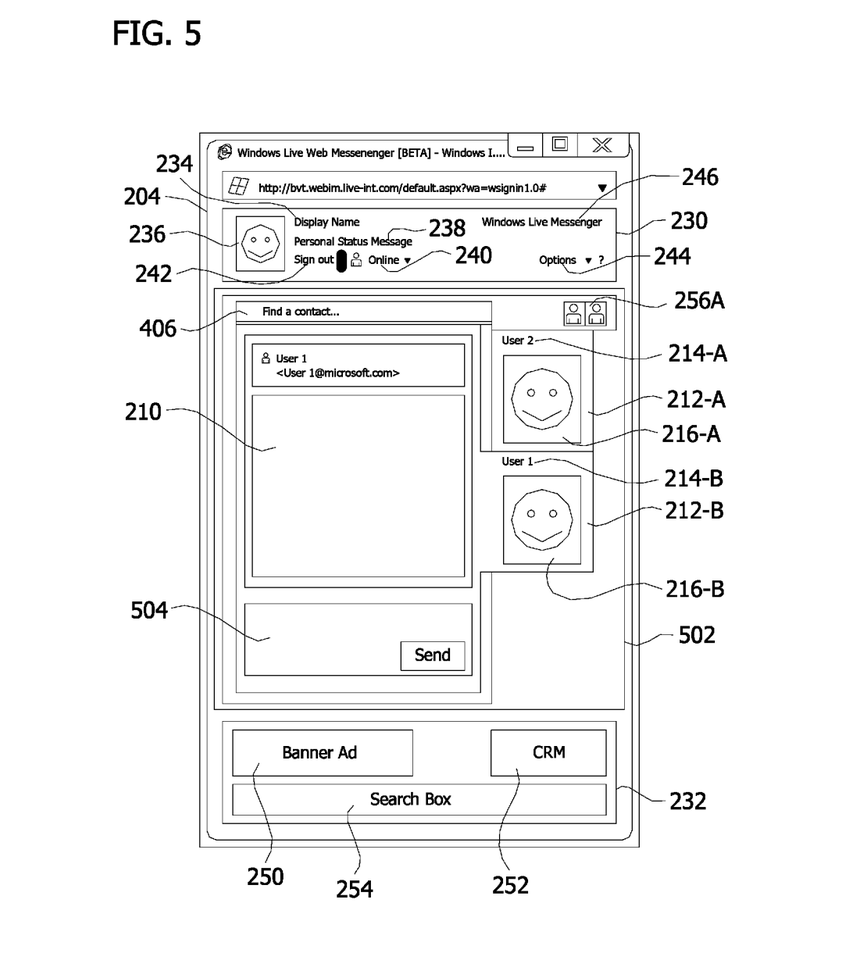
FIG. 5 is a drawing of an exemplary instant messaging window operating in full conversation mode for providing integrated multi-session instant messaging according to an embodiment of the invention.

Referring to FIG. 5, the user interface displays content associated with the full conversation mode. In particular, a full display area 502 is displayed in the display area of the IM window 204. The full display area 502 displays a plurality of identifying components 212 (discussed above) corresponding to the plurality of conversation panes 208. Each identifying component 212 may be configured to notify the user of a new message received from the identified remote user 104. Additionally or alternatively, a corresponding new window selection component (discussed above) may be arranged in each of the identifying components 212 for receiving a request from the local user 108 to generate a new window displaying the conversation pane 208 associated with the corresponding identifying component. The full display area 502 also displays a message component 210 (discussed above) and an input component 504, both corresponding to a selected conversation pane, so that the identifying components 212, the message component 210 and the input component 504 are all simultaneously viewable in the full display area 502. The input component 504 is configured to receive data from the local user 108 for communicating via an instant message to the remote user 104 of the messaging session represented by said selected conversation pane. The identifying components 212, message component, and input component 504 are sized so that the local user 108 can focus on the selected conversation while maintaining convenient access to other conversations.

Figure 6:
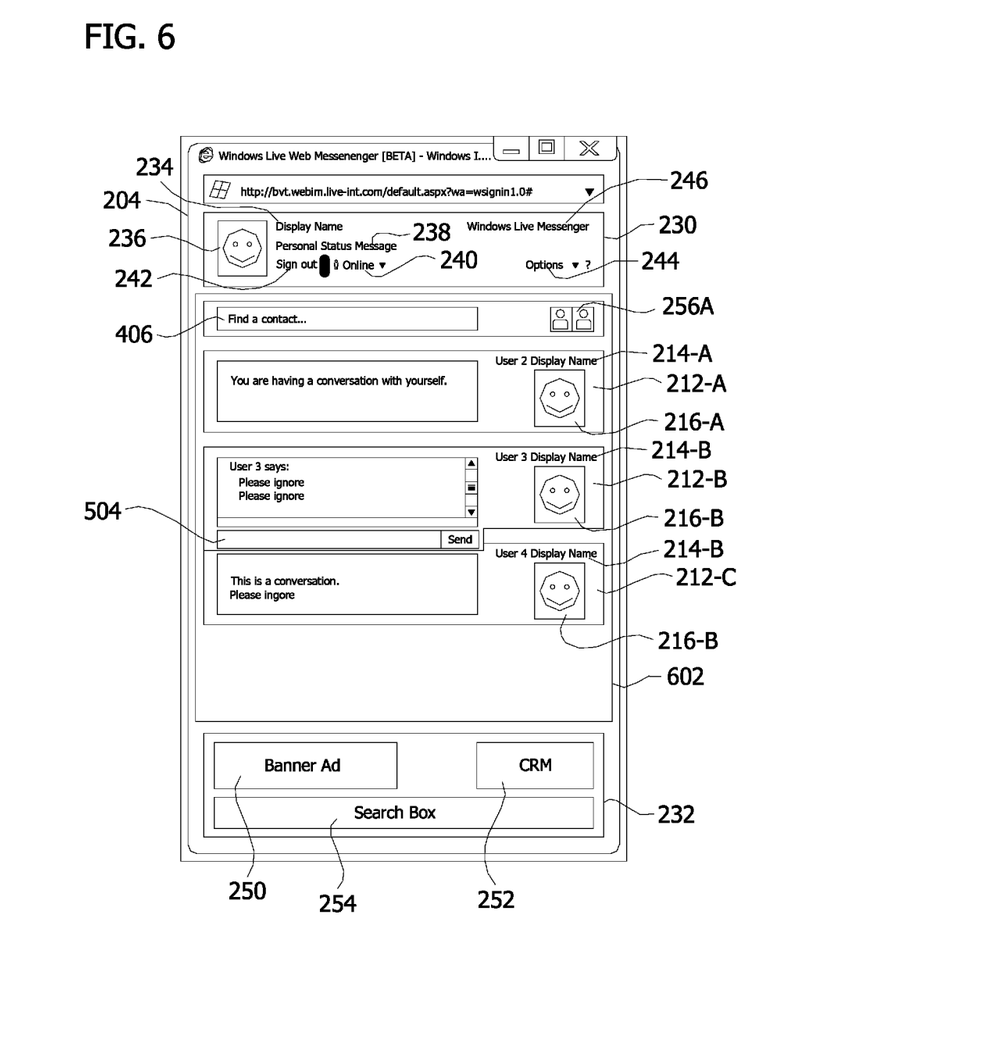
FIG. 6 is a drawing of an exemplary instant messaging window operating in conversation exchange mode for providing integrated multi-session instant messaging according to an embodiment of the invention.

Referring to FIG. 6, the user interface displays content associated with the conversation exchange mode. In particular, an exchange display area 602 is displayed in the display area of the IM window 204. The exchange display area 602 displays at least two of the conversation panes 208 linearly along the height of the window and an input component 504 corresponding to a selected one of the at least two conversation panes 208. As displayed, the messaging and input components 210, 504 of the selected conversation pane 208 and at least a portion of the message component 210 of the other conversation pane 208 are simultaneously viewable in the exchange display area 602. Accordingly the local user 108 can view content and send messages from different conversations simultaneously. The local user 108 can also quickly and efficiently switch between conversations with a simple key stroke.

Figure 7:
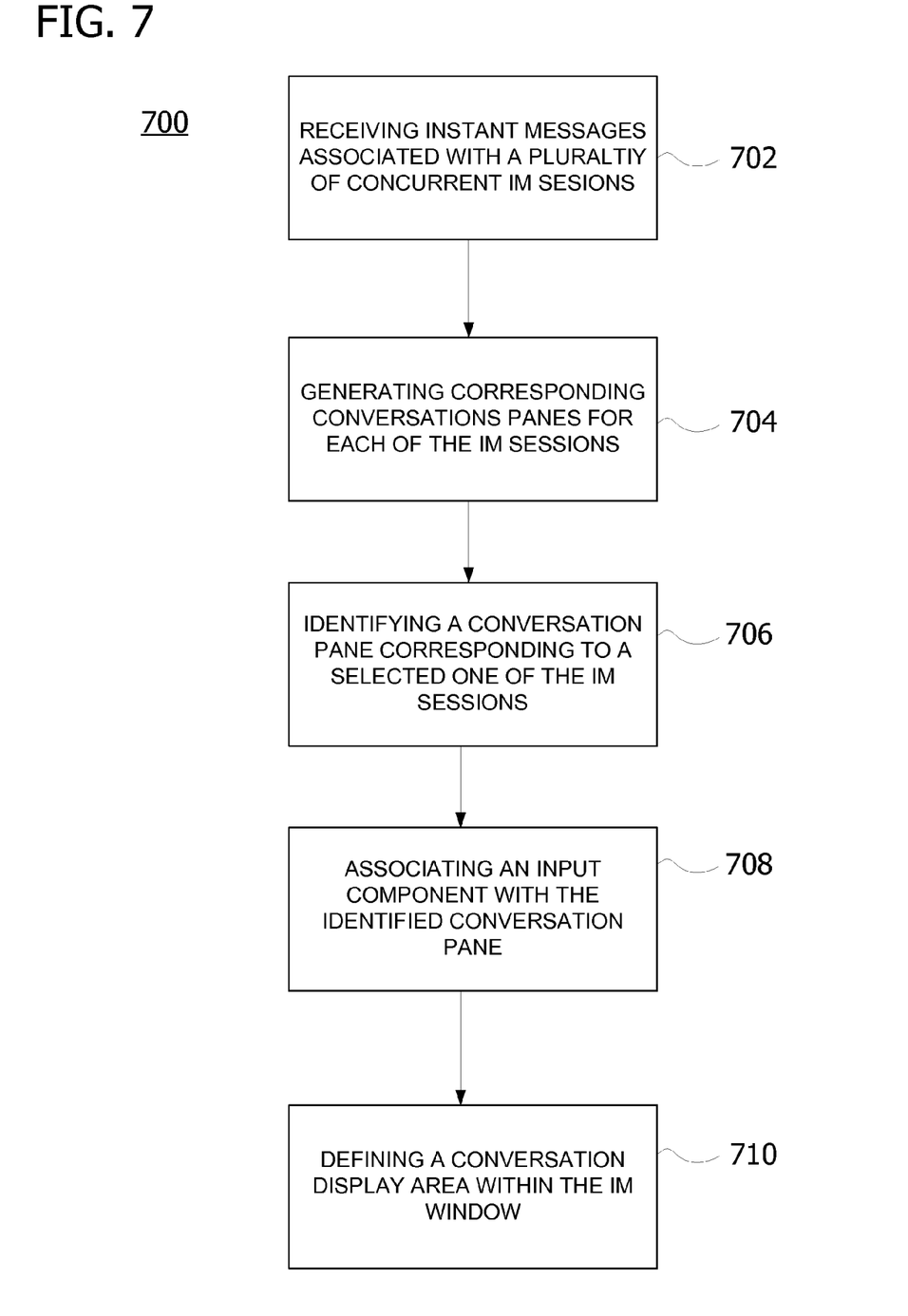
FIG. 7 is a block diagram illustrating an exemplary method for providing multi-session instant messaging according to an embodiment of the invention.

FIG. 7 is a block diagram illustrating an exemplary method 700 for providing aspects of the user interface discussed in conjunction with the conversation exchange mode. In one embodiment, the method may be carried out by the server 106 for providing instant messaging via a single IM window 204 in an environment 100 having a server-based architecture. In another embodiment, the method may be carried out by the local computing device 102 for providing instant messaging via a single IM window 204 in an environment 100 having a client-based architecture. At 702, the method includes receiving instant messages associated with a plurality of concurrent instant messaging sessions involving the local user 108. At 704, the method includes generating a distinct corresponding conversation pane 208 for each of the plurality of messaging sessions. Each corresponding conversation pane 208 has a message component 210 (discussed above). At 706, the method includes identifying a conversation pane 208 corresponding to a selected one of the messaging sessions. In one embodiment, the selected messaging session is indicated via a user request to send a message in connection with the messaging session. At 708, the method includes associating an input component 504 with the identified conversation pane. As discussed above, the input component is configured to receive data from the local user 108 for communicating to the remote user 104 of the selected messaging session via an instant message. At 710, the method includes defining a conversation display area 206 within the IM window 204. The identified conversation pane 208 and at least one other conversation pane 208 are aligned in the conversation display area 206 along the height of the IM window 204 so that the messaging and input components 210, 504 of the identified conversation pane 208 and at least a portion of the message component 210 of the other conversation pane 208 are simultaneously viewable in the conversation display area 206 of the IM window 204.

The order of execution or performance of the operations illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the invention.

Aspects of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for providing integrated multi-session instant messaging, said method comprising:
  generating a user interface on a computing device of a local user, said user interface comprising a single instant messaging window, said messaging window having a window height and a window width;
  defining a conversation display area in the messaging window as a function of the window height and the window width;
  receiving instant messages associated with a plurality of concurrent instant messaging sessions between the local user and a plurality of remote users, wherein each messaging session is between the local user and a different one of the remote users;
  generating, for each of the plurality of concurrent instant messaging sessions, a distinct corresponding conversation pane within the conversation display area of the messaging window, each conversation pane having a message component for displaying text from at least one of the received instant messages associated with the corresponding messaging session; and associating a set of the conversation panes with the conversation display area, said set having a pre-determined number of conversation panes specified by the user, wherein the conversation panes of said set are horizontal tabs in the conversation display area that are sequentially stacked along the height of the messaging window so that the message components of the conversation panes of said set are simultaneously viewable in the conversation display area of the messaging window.

2. The method of claim 1 wherein the specific number of conversation panes in said set is the lesser of the number of concurrent instant messaging sessions and a pre-determined maximum number of conversation panes.

3. The method of claim 1 further comprising receiving a request from the user to change the set of conversation panes associated with the conversation display area; and responsive to receiving said request, associating another set of the conversation panes with the conversation display area, said other set of conversation panes being different from the set of conversation panes to be changed, said conversation panes of said other set being horizontal tabs in the conversation display area that are sequentially stacked along the height of the messaging window so that the message components of the conversation panes of said other set are simultaneously viewable in the conversation display area of messaging window.

4. The method of claim 1 wherein the conversation panes of the set are arranged in separate rows in the conversation display area, and wherein said defining includes assigning one pane height to each of the conversation panes, said pane height defining a row height for each of the rows in the conversation display area, wherein said pane height is fixed relative to the window height.

5. The method of claim 1 wherein said defining includes determining a one pane width as a function of the window width and assigning the determined pane width to each of the conversation panes.

6. The method of claim 1 wherein the instant messaging window is a web browser window.

7. The method of claim 1 wherein the instant messaging window is an application window, said application being an instant messaging application installed on a computing device associated with the local user.

8. A user interface implemented on a computing device of a local user, said user interface comprising:

a plurality of conversation panes representative of concurrent instant messaging sessions between the local user and a plurality of remote users, wherein each conversation pane represents one of the messaging sessions and each messaging session is between the local user and a different one of the remote users;

a plurality of message components arranged in the plurality of conversation panes, each message component being arranged in one corresponding conversation pane and each message component displaying text from an instant message exchanged between the local user and one of the remote users during the message session represented by the corresponding conversation pane;

an instant messaging window displaying a conversation display area within said messaging window, said messaging window having a window height and a window width; said conversation display area being configured to display up to a pre-determined number of the conversation panes as a function of the window height and the window width, said pre-determined number specified by the user;

a conversation pane selection component when the number of conversation panes exceeds the pre-determined number of conversation panes that the conversation display area is configured to display, said conversation selection component for receiving a request from the local user to display at least one conversation pane that is different from the conversation panes being displayed by the conversation display area, wherein said conversation display area displays at least a first conversation pane and a second conversation pane of the plurality of conversation panes linearly along the height of the window, said second conversation pane being arranged beneath said first conversation pane along the height of the window so that the message components arranged in said first and second conversation panes are simultaneously viewable; and a new window selection component for receiving a request from the local user for a new window to be generated that displays a selected conversation pane.

9. The user interface of claim 8 wherein the conversation pane selection component includes a scrollbar configured to scroll the set of simultaneously viewable conversation panes.

10. The user interface of claim 8 further comprising a mode selection component for receiving a request from the local user for the instant messaging window to replace the conversation display area with one of the following display areas: a contacts display area, an exchange display area, a full display area.

11. The user interface of claim 10 wherein the exchange display area displays:

at least two of the conversation panes linearly along the height of the window; and an input component corresponding to a selected one of the at least two conversation panes, said input component for receiving data from the local user for communicating via an instant message to the remote user of the messaging session represented by said selected conversation pane;

wherein the messaging and input components of the selected conversation pane and at least a portion of the messaging component of the other conversation pane are simultaneously viewable in the exchange display area.

12. The user interface of claim 10 wherein the full display area displays:

a plurality of identifying components corresponding to the plurality of conversation panes, each identifying component corresponding to one of the conversation panes, and each identifying component displaying information identifying the remote user of the messaging session represented by the corresponding conversation pane;

the message component corresponding to a selected conversation pane; and an input component corresponding to the selected conversation pane, said input component for receiving data from the local user for communicating via an instant message to the remote user of the messaging session represented by said selected conversation pane, wherein said plurality of identifying components, said message component, and said input component are simultaneously viewable in the full display area.

13. The user interface of claim 10 wherein the contacts display area displays a contact list associated with the local user, said contact list identifying one or more remote users.

14. The user interface of claim 8 further comprising a plurality of identifying components being arranged in the plurality of conversation panes, each identifying component being arranged in one corresponding conversation pane and each identifying component displaying information identifying the remote user of the messaging session represented by the corresponding conversation pane.

15. A method for providing integrated multi-session instant messaging, said method comprising:

generating a user interface on a computing device of a local user, said user interface comprising a single instant messaging window, said messaging window having a window height and a window width;

defining a conversation display area within the messaging window as a function of the window height and the window width;

receiving instant messages associated with a plurality of concurrent instant messaging sessions between the local user and a plurality of remote users, wherein each messaging session is between the local user and a different one of the remote users;

generating, for each of the plurality of messaging sessions, a distinct corresponding conversation pane within the conversation display area of the messaging window up to a pre-determined number of distinct conversation panes, said pre-determined number specified by the user via the user interface, each conversation pane having a message component for displaying text from at least one of the received instant messages associated with the corresponding messaging session;

identifying a conversation pane corresponding to a selected one of the messaging sessions;

associating an input component with the identified conversation pane, said input component for receiving data from the local user for communicating to the remote user of the selected messaging session via an instant message; and aligning the identified conversation pane and at least one other conversation pane in the conversation display area along the height of the messaging window, said at least one other conversation pane being arranged above or beneath said identified conversation pane along the height of the window so that the messaging and input components of the identified conversation pane and at least a portion of the messaging component of the other conversation pane are simultaneously viewable in the conversation display area of the messaging window.

16. The method of claim 15 wherein the instant messaging window is a web browser window.

17. The method of claim 15 wherein the instant messaging window is an application window, said application being an instant messaging application installed on a computing device associated with the local user.

\* \* \* \* \*